A. R. TRIST.
CUP RING PACKED PISTON OR PLUNGER.
APPLICATION FILED JUNE 21, 1913.
1,083,957.
Patented Jan. 13, 1914.
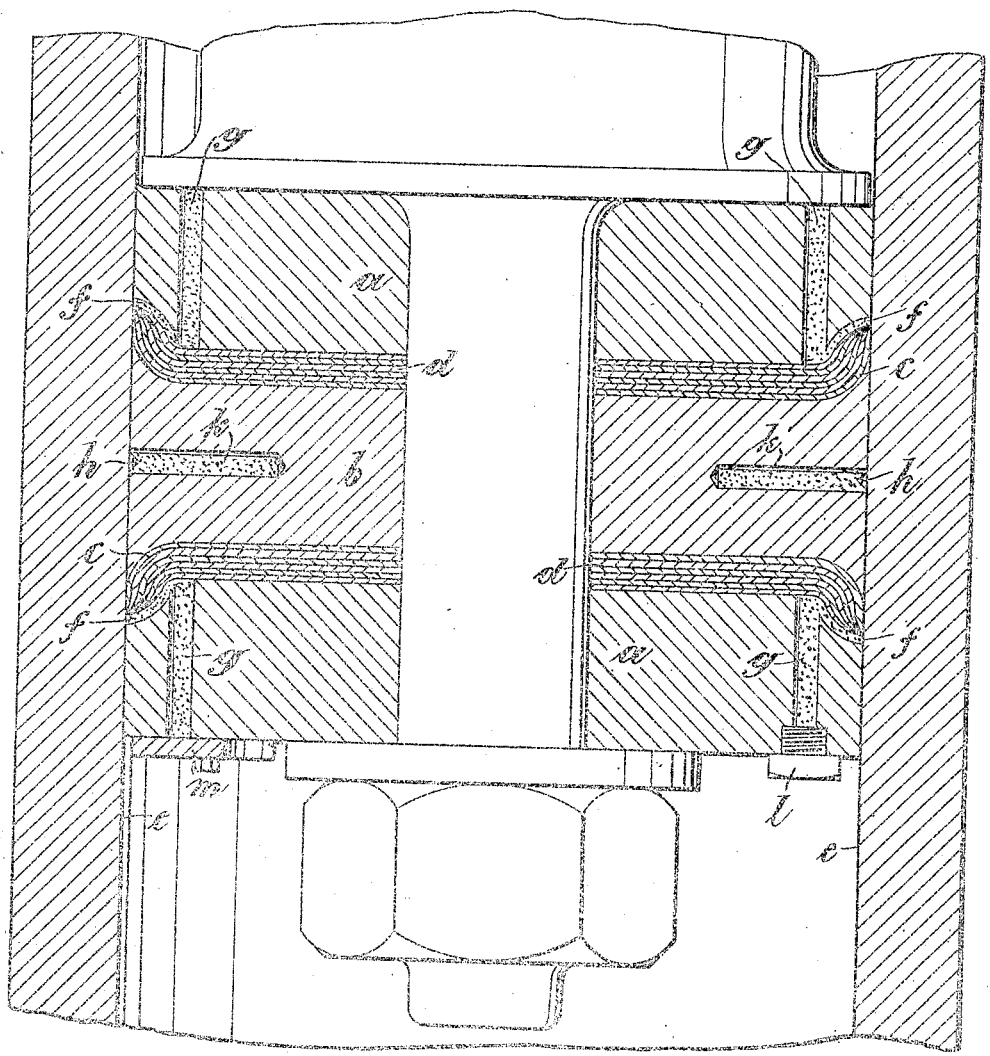
WITNESSES:
INVENTOR:
Arthur Ronald Trist

UNITED STATES PATENT OFFICE.

ARTHUR RONALD TRIST, OF LONDON, ENGLAND.

CUP-RING-PACKED PISTON OR PLUNGER.

1,083,957.

Specification of Letters Patent. Patented Jan. 13, 1914.

Application filed June 21, 1913. Serial No. 774,953.

*To all whom it may concern:*

Be it known that I, ARTHUR RONALD TRIST, subject of the King of Great Britain and Ireland, residing at Coronation House, 4 Lloyd's avenue, in the city of London, England, have invented new and useful Improvements in and Relating to Cup-Ring-Packed Pistons or Plungers, of which the following is a specification.

This invention relates to cup ring packed pistons or plungers and has for its object the construction and arrangement of such a device whereby the cup ring is properly supported and an efficient and continuous supply of lubricant is afforded during the life of the cup ring to maintain its efficiency and durability.

It has been found that cup rings composed of layers of textile material cemented together with india rubber or other suitable agglutinant and molded with a feather edge give a very efficient result but experience has shown that it is essential to afford a continuous supply of lubricant during the life of the cup ring packing in order to obtain a reasonable amount of durability and avoid undue wear in parts.

In order that the invention may be the better understood, I will now proceed to describe the same in relation to the accompanying drawing, which is a sectional view of a cylinder and plunger, the rod being shown in full.

The invention consists in forming the junk rings $a$ and the plunger or piston body $b$ of the shape as shown in the drawing so as to support the flange portion $c$ of the cup ring packing $d$ and prevent it being deformed by the friction set up between the ring $d$ and the wall $e$ of the cylinder or valve in which the piston or plunger works. A recess $f$ is left between the junk ring $a$ and the cup ring $d$ which communicates with a cylinder wall $e$ one end, and a recess $g$ at the other end, such recess being formed right through the body of the junk ring and having an opening through which the recess can be filled with lubricant of a more or less solid character. A series of these recesses $g$ are arranged around the junk ring so as to give a continuity of supply of lubricant to the whole periphery of the cup ring. In some cases I form a groove $h$ around the body $b$ and from this groove is arranged at intervals a series of recesses $h$ so that the walls of the cylinder are lubricated at a point intermediate of the two cup packing rings $d$. These recesses $h$ are independent one of the other and are filled from the opening at the periphery of the piston body $b$. In order to prevent the lubricant from escaping I may provide each recess with a screwed cap $l$ as shown at the bottom right hand side of the figure or with a ring $m$ as shown at the bottom left hand side of the figure, or with a flanged shoulder made up of such a diameter as when the parts are assembled the top end of the recess is closed as shown on both sides of the upper end of the figure.

Having thus fully described my invention, I claim as new and desire to secure by Letters Patent:—

1. A cup ring packed piston or plunger having a space between a junk ring and piston body of a shape to contain the cup ring, the walls of such space being adapted to support the outer curved portion of the turned down flange or lip of the ring and to provide a space at the back of the cup ring and at the extremity of the flange or lip when said ring is in place adapted to contain lubricating material which can be delivered by capillary attraction to the cylinder wall, during the reciprocation of the piston or plunger, substantially as described.

2. A cup ring packed piston or plunger having a space between a junk ring and piston body of a shape to contain the cup ring the walls of such space being adapted to support the outer curved portion of the turned down flange or lip of the ring and to provide a space at the back of the cup ring and at the extremity of the flange or lip when said ring is in place adapted to contain lubricating material which can be delivered by capillary attraction to the cylinder wall, during the reciprocation of the piston or plunger, and a series of recesses adapted to contain lubricant and situated adjacent to and communicating at intervals with the said space at the back of the cup ring, substantially as described.

3. A cup ring packed piston or plunger having a space between a junk ring and piston body of a shape to contain the cup ring the walls of such space being adapted to support the outer curved portion of the turned down flange or lip of the ring and to provide a space at the back of the cup ring and at the extremity of the flange or lip when said ring is in place, adapted to contain lubricating material which can be delivered by capillary attraction to the cylinder wall, a series of recesses situated adjacent to and communicating at intervals with the said space at the back of the ring, means of access to said recesses from the outside of said piston plunger for the purpose of filling the same with lubricating material and detachable closing means to said means of access for preventing the escape of lubricant other than at the periphery of the piston or plunger, substantially as described.

4. A cup ring packed piston or plunger having a space between a junk ring and piston body of a shape to contain the cup ring the walls of such space being adapted to support the outer curved portion of the turned down flange or lip of the cup ring and to provide a space at the back of the cup ring and at the extremity of the flange or lip adapted to contain lubricating material which can be delivered by capillary attraction to the cylinder wall, during the reciprocation of the piston or plunger, and a series of recesses adapted to contain lubricant situated adjacent to and communicating at intervals with the said space at the back of the cup ring, in combination with a series of recesses in the piston body having openings at the periphery thereof and adapted to deliver lubricant contained therein to the cylinder wall by capillary attraction, substantially as described.

In testimony whereof I have signed my name to this specification in the presence of two subscribing witnesses.

ARTHUR RONALD TRIST.

Witnesses:
 WALTER CARVER,
 O. J. WORTH.